United States Patent Office 3,248,789
Patented May 3, 1966

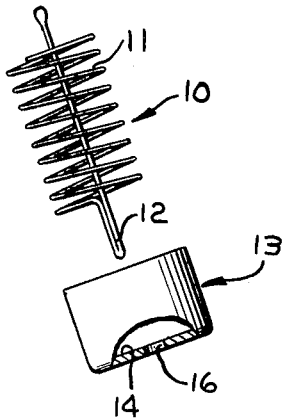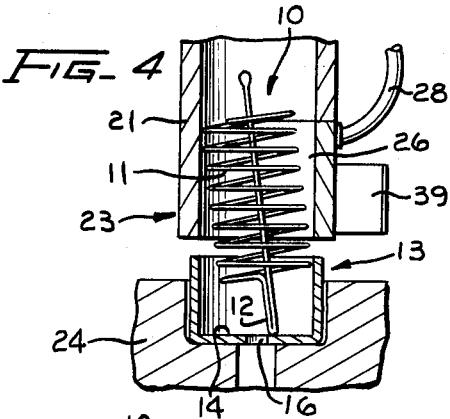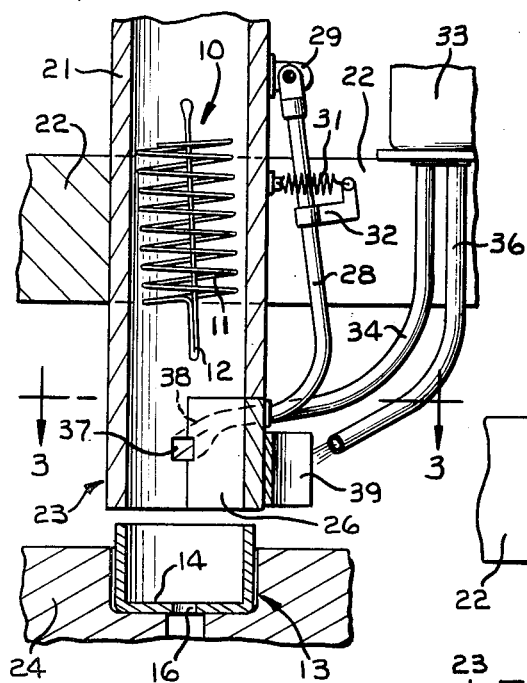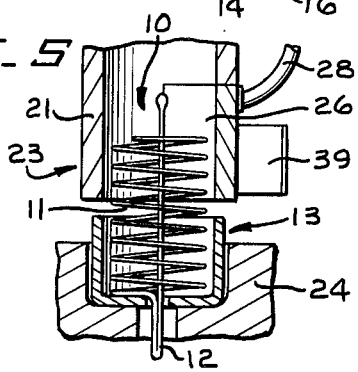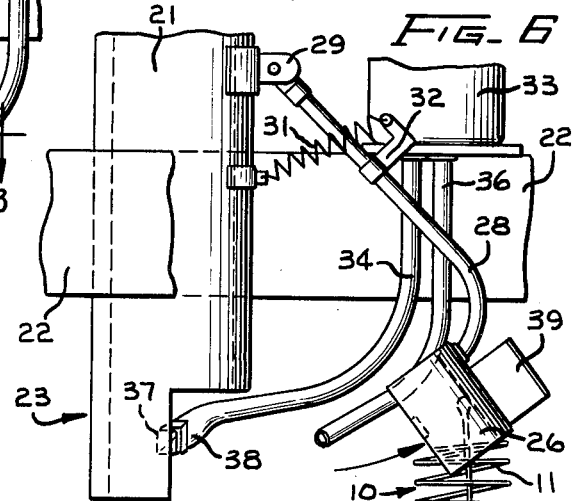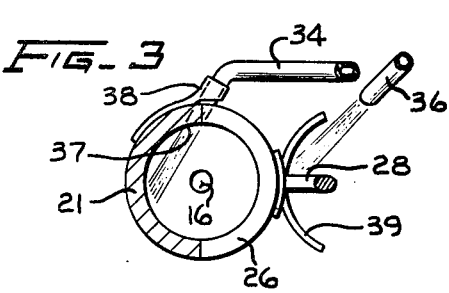

3,248,789
METHOD OF ASSEMBLING AN ARTICLE HAVING A PROJECTING PORTION WITH AN OBJECT HAVING A RECESS THEREIN
Gary G. Seaman, Omaha, Nebr., assignor to Western Electric Company Incorporated, New York, N.Y., a corporation of New York
Filed Aug. 11, 1964, Ser. No. 388,838
5 Claims. (Cl. 29—428)

This invention relates to a method of assembling articles, and more particularly to a method of assembling a generally cylindrical article having a reltaively thin axially projecting portion with an object having a surface with a recess for receiving the projecting portion. It is an object of this invention to provide an improved method of such character.

In various assembly operations, an article having a generally cylindrical body portion with a relatively thin axially projecting portion must be assembled with an object having a surface with a recess therein in such a manner that the projecting portion of the article is freely received within the recess of the object. In many instances, the diameter of the generally cylindrical body portion of the article is of a noncritical dimension and may vary within relatively broad tolerance limits. Also, the projecting portion of such an article may be constructed of material which may be easily displaced from true axial alignment with the cylindrical body portion of the article.

Articles of such a nature, having either a noncritical dimension on the diameter of the cylindrical body portion thereof or an axial projection constructed of deformable material or a combination of both of these factors, are not amenable to known assembly techniques for positioning the projecting portion of the article in a recess in the surface of an object. For example, such an article cannot be assembled with a recessed object by passing the article through a guide tube of fixed critical diameter such that the proejcting portion of the article is guided direcly into the recess of an object which has been aligned with the guide tube. Since the diameter of the body portion of the article may vary within relatively broad tolerance limits, this assembly technique fails because the body portion of the article does not present a guide surface which is fixed within narrow dimensional limits with respect to the projecting portion of the article. Again, if the projecting portion of the article is bent slightly away from true axial alignment with the body portion of the article, the assembly technique will fail because the projecting portion will not have the proper relative placement with respect to the recess at the end of is travel through the guide member.

It is, therefore, another object of this invention to provide a method of assembling a generally cylindrical article having a relatively thin axially projecting portion with an object having a surface with a recess for receiving the projecting portion which insures proper assembling of these parts even though the generally cylindrical body portion of the article is not held within close dimensional tolerances.

It is still another object of this invention to provide a method of assembling a generally cylindrical article having a relatively thin axially projecting portion with an object having a surface with a recess for receiving the projecting portion which insures proper assembling of these parts even though the relatively thin, axially projecting portion of the article is not in a true axial alignment with the cylindrical body portion thereof.

It is a further object of this invention to provide a method of assembling a generally cylindrical article having a relatively thin, axially projecting portion with an object having a surface with a recess for receiving the projecting portion which is simple in operation, efficient in use, and relatively inexpensive to utilize.

In accordance with the method of this invention, a container, which freely receives the article having a projecting portion, is relatively positioned closely adjacent an object having a surface with a recess therein for receiving the projecting portion. The article having the projecting portion is arranged in the container such that the projecting portion thereof bears against the surface of the object. The article is freely rotated within the container such that the projecting portion thereof moves about the surface of the object until the projecting portion is aligned with and enters the recess.

This invention, together with further objects and advantages thereof, will best be understood by reference to the following description taken in conjunction with the accompanying drawings, in which:

FIG. 1 is a view of an article and an object amenable to assembly by the method of this invention;

FIG. 2 is a cross-sectional, elevational view of a preferred type of apparatus which may be utilized in performing the method of this invention;

FIG. 3 is a cross-sectional view taken along the line 3—3 of FIG. 2;

FIG. 4 is a cross-sectional view of a portion of the preferred apparatus showing the article in a position it assumes prior to its final assembly with the object;

FIG. 5 is a cross-sectional view of a portion of the preferred apparatus showing the article and object in an assembled condition; and FIG. 6 is an elevational view showing the assembled article and object being removed from the apparatus.

In FIG. 1, an article 10 is depicted which has both a generally cylindrical body portion 11, defined by coiled spring wire, and an axially projecting portion 12, defined by a reverse loop of the wire. The article is a coil spring utilized for tensioning a fuse portion of a fuse assembly. In one operation of producing such a fuse assembly, the coil spring must be assembled with an end cap 13, the end cap having a surface 14 with an axial opening 16 therethrough for receiving the projetcing portion 12 of the coil spring. The diameter of the generally cylindrical body portion 11 of the coil spring is non-critical and therefore varies within relatively broad tolerance limits. The spring wire utilized in constructing the coil spring is relatively flexible and therefore the projecting portion 12 of the coil spring is easily deformed from true axial alignment with the cylindrical body portion during production of the coil spring.

In FIG. 2, there is shown a preferred type of apparatus which may be utilized in practicing the method of this invention in assembling the coil spring 10 and the end cap 13. In the preferred apparatus, a container in the form of a feed tube 21 is shown secured to a suitable support member 22 such that the tube's central axis is vertically disposed. The feed tube 21 has an internal diameter of sufficient dimension to freely receive the body portion 11 of the coil spring even though the body portion has a diameter equal to its maximum dimensional tolerance limit.

Disposed horizontally below the discharge end 23 of the feed tube 21 is a work table 24 which is suitably supported and indexible by mechanism (not shown) to individually present successive end caps 13 for an assembly opertion. The top of each end cap is positioned closely adjacent the discharge end of the feed tube with the central axis of the cap aligned with the central axis of the tube.

A portion of the discharge end 23 of the feed tube 21 is defined by a door 26 of an escapement device. The door is supported by an arm 28 which in turn is pivotably attached to a bracket 29 suitably secured to the feed tube 21 at a position spaced above the discharge end thereof. A spring 31, secured at one end to the feed tube 21 and at the other end to a bracket 32 affixed to the arm 28, biases the arm and the door to a normal position wherein the door portion of the escapement device is in engagement with the feed tube and forms a portion of the wall thereof. The door pivots outwardly from the tube to allow removal of an assembled cap and spring when the work table 24 is indexed.

The support member 22 also has affixed thereto an air valve 33 which is cyclically operable to deliver air from an air supply (not shown) to air lines 34 and 36. The air line 34 terminates in a square entrance port 37 in the interior of the feed tube 21. A final approach channel 38 to the entrance port is positioned such that air flowing therethrough will be directed into the feed tube tangentially of and obliquely downward of the axis of the tube so as to assemble the spring and the end cap in a manner to be described hereinafter.

The air line 36 terminates in front of a semicircular air deflection plate 39 suitably secured to the door 26. At such times as air is being admitted to the interior of feed tube 21, air is also directed against the deflection plate 39 such that a balancing of forces occurs on both sides of the door, and the door, biased by the spring 31, remains in its normal, closed position.

*Operation*

The method of is invention is initiated by positioning an individual end cap 13 below the discharge end 23 of the feed tube 21. As shown in FIG. 2, the work table 24 presents successive end caps to a position closely adjacent the end of the tube with the axis of the opening 16 in the cap relatively aligned with the central axis of the tube.

After the alignment of the end cap 13, the coil spring 10, delivered to the feed tube 21, assumes a canted position with its projecting portion 12 bearing against the surface 14 of the end cap and with its cylindrical body portion 11 resting against the side wall of the feed tube. In the disclosed embodiment, this delivery may be accomplished by a suitable feeding mechanism (not shown) which feeds properly oriented, individual springs into the feed tube in response to the positioning of the end cap below the feed tube. The spring passes down the tube until the projecting portion thereof engages the surface 14 of the end cap at which time the spring will come to rest in the canted position shown in FIG. 4.

The air valve 33 is actuated in a timed relationship to the feeding of the spring 10 such that air is admitted through the square port 37 to the interior of the tube 21 after the spring has come to rest in the canted position. The air, guided through the channel 38, enters the tube tangentially of and obliquely downwardly of the spring. The tangential component of the air stream intercepts the cylindrical body portion 11 of the spring and causes the spring to rotate about its projecting portion. As the velocity of rotation of the spring increases, the spring tends to move from its canted position toward a position of axial alignment with the central axis of the feed tube. During the movement of the spring from the canted to the aligned position, the tip of the projecting portion moves about over the surface portion 14 of the end cap. When the projecting portion of the spring becomes aligned with the opening 16 in the end cap, the component of the air stream which intercepts the spring downwardly of its central axis will cause the projecting portion to be advanced into the opening in the end cap and assume the position depicted in FIG. 5. If the article having the projecting portion is of sufficient weight a downward component of the air stream is unnecessary as gravity will cause movement of the projecting portion into the recess when they are relatively aligned.

During the time that air is being admitted to the interior of the feed tube 21, air from the air line 36 is being directed against the deflection plate 39 to keep the door 26 of the escapement device in the normally closed position. When the spring has been seated in the end cap, the air valve 33 closes such that no air is admitted to the interior of the feed tube or directed against the deflection plate.

The assembled spring 10 and end cap 13 are removed from the assembly apparatus upon index of the table 24 which supports the end cap. As shown in FIG. 6, indexing of the assembled spring and end cap from a position beneath the feed tube 21 causes an opening of the door 26 of the escapement device. The spring 10 engages the door and causes it to pivot outwardly from the feed tube and about the support 29 until such time as the assembly is advanced beyond the point at which the spring remains in contact with the door. The door is then biased back to its normal position by the spring 31 so as to define a portion of the discharge end 23 of the feed tube. Index of the work table to remove the assembled spring and end cap also presents a new and end cap below the feed tube for the assembly operation.

There has been shown herein a method for assembling a cylindrical article having a relatively thin axially projecting portion with an object having a surface with a recess for receiving the projecting portion. The method insures proper assembly of these parts even through the relatively thin axially projecting portion of the article is not in a true axial alignment with the cylindrical body portion thereof and/or even though the cylindrical body portion of the article is not held within close dimensional tolerances. The method disclosed herein is simple in operation, efficient in use and relatively inexpensive to utilize.

While an embodiment of the invention has been disclosed herein many modifications will be apparent. For example, the feed tube 21 may take the form of a simple container which freely receives an article placed therein by a manual operation. It is intended that the invention be interpreted as including all modifications which fall within the true spirit and scope of the invention.

What is claimed is:

1. The method of assembling a generally cylindrical article having a relatively thin axially projecting portion with an object having a surface with a recess for freely receiving the projecting portion, which comprises the steps of:
   relatively positioning, closely adjacent one another, a container, which freely receives the article, and the object such that the recess in the object is generally aligned with the container;
   placing the article in the container with the projecting portion thereof bearing against the surface of the object; and
   directing a stream of gas into the container tangentially of the article so as to rotate the article freely within the container such that the projecting portion thereof moves about the surface of the object until the projecting portion is aligned with and enters the recess.

2. The method of assembling a generally cylindrical article having a relatively thin portion projecting substanially from central axis thereof with an object having a surface with a recess for freely receiving the projecting portion, which comprises the steps of:
   relatively positioning, closely adjacent one another, a feed tube, which freely receives the article, and the object such that the recess in the object is generally aligned with the axis of the feed tube;
   feeding the article down the feed tube until the projecting portion thereof bears against the surface of the object; and
   directing a stream of gas into the feed tube tangentially of the article so as to rotate the article freely within the feed tube such that the projecting portion thereof moves about the surface of the object until the projecting portion is relatively aligned with the axis of the tube and enters the recess.

3. The method of assemblying a generally cylindrical, relatively lightweight article having a relatively thin axially projecting portion with an object having a surface with a recess for freely receiving the projecting portion, which comprises the steps of:

relatively positioning, closely adjacent one another, a feed tube, which freely receives the article, and the object such that the recess in the object is generally aligned with the feed tube;

feeding the article down the feed tube until the projecting portion thereof bears against the surface of the object; and directing a stream of gas into the feed tube obliquely of the article so that the tangential component of the gas stream rotates the article freely within the feed tube whereby the projecting portion moves about the surface of the object and so that the downward component of the gas stream forces the projecting portion into the recess when the projecting portion is rotated to an aligned position with respect to the recess.

4. The method of assembling a generally cylindrical, relatively lightweight article having a relatively thin portion projecting substantially from the central axis thereof with an object having a surface with a recess for freely receiving the projecting portion, which comprises the steps of:

relatively positioning, closely adjacent one another, a feed tube, which freely receives the article, and the object such that the recess in the object is generally aligned with the axis of the feed tube;

feeding the article down the feed tube until the projecting portion of the article bears against the object; and directing a stream of gas into the feed tube obliquely of the article so that the tangential compoment of the gas stream rotates the article freely within the tube whereby the projecting portion moves about the surface of the object and so that the downward component of the gas stream forces the projecting portion into the recess when the projecting portion is rotated to a position substantially aligned with respect to the axis of the tube.

5. The method of assembly a cylindrical wire spring having a relatively thin portion projecting substantially from the central axis thereof with a circular end cap having an axially located hole therethrough for freely receiving the projecting portion which comprises the steps of:

relatively positioning, closely adjacent one another, a fed tube, which freely receives the wire spring, and the end cap such that the hole through the cap is generally aligned with the axis of the feed tube;

feeding the wire spring down the feed tube until the projecting portion thereof bears against the end cap; and directing a stream of air into the feed tube obliquely of the wire spring such that the tangential component of the air stream rotates the spring whereby the projecting portion thereof is moved over the surface of the end cap and such that the downward component of the air stream forces the projecting portion of the spring into the hole of the end cap when the projecting portion is rotated to a position substantially aligned with the axis of the tube.

References Cited by the Examiner

UNITED STATES PATENTS

| 2,823,781 | 2/1958 | Bosch | 193—43 |
| 3,034,633 | 5/1962 | Clifford et al. | 198—33 |
| 3,063,213 | 11/1962 | Goran | 221—1 |
| 3,169,308 | 2/1965 | Goran | 29—429 |
| 3,183,582 | 5/1965 | Birkett | 29—200 |

JOHN F. CAMPBELL, *Primary Examiner.*

THOMAS H. EAGER, *Examiner.*